United States Patent
Kato et al.

(10) Patent No.: US 11,434,953 B2
(45) Date of Patent: Sep. 6, 2022

(54) ELECTRIC ACTUATOR

(71) Applicant: NTN Corporation, Osaka (JP)

(72) Inventors: Akio Kato, Shizuoka (JP); Yuuki Naitou, Shizuoka (JP); Youhei Yamashita, Shizuoka (JP)

(73) Assignee: NTN CORPORATION, Osaka (JP)

( * ) Notice: Subject to any disclaimer, the term of this patent is extended or adjusted under 35 U.S.C. 154(b) by 234 days.

(21) Appl. No.: 16/762,980

(22) PCT Filed: Nov. 22, 2018

(86) PCT No.: PCT/JP2018/043279
§ 371 (c)(1),
(2) Date: May 11, 2020

(87) PCT Pub. No.: WO2019/103124
PCT Pub. Date: May 31, 2019

(65) Prior Publication Data
US 2020/0400188 A1 Dec. 24, 2020

(30) Foreign Application Priority Data
Nov. 27, 2017 (JP) .............................. JP2017-226806

(51) Int. Cl.
*F16C 17/02* (2006.01)
*F16C 19/34* (2006.01)
(Continued)

(52) U.S. Cl.
CPC .............. *F16C 17/02* (2013.01); *F16C 19/34* (2013.01); *F16C 33/20* (2013.01); *F16C 33/583* (2013.01);
(Continued)

(58) Field of Classification Search
CPC .......... F16C 17/02; F16C 19/34; F16C 33/20; F16C 33/583; F16H 25/20; H02K 7/116
See application file for complete search history.

(56) References Cited

U.S. PATENT DOCUMENTS 4,706,512 A * 11/1987 McKernon ............. H02K 23/68
74/411
2009/0277290 A1 11/2009 Stubner et al.
(Continued)

FOREIGN PATENT DOCUMENTS

| JP | 57-45289 | 3/1982 |
|---|---|---|
| JP | 3-77814 | 8/1991 |

(Continued)

OTHER PUBLICATIONS

International Preliminary Report on Patentability and Written Opinion of the International Searching Authority dated Jun. 2, 2020 in International (PCT) Patent Application No. PCT/JP2018/043279.
(Continued)

*Primary Examiner* — David M Fenstermacher
(74) *Attorney, Agent, or Firm* — Wenderoth, Lind & Ponack, L.L.P.

(57) ABSTRACT

An electric actuator 1 includes: an electric motor 10; a first motion conversion mechanism 20 that has a screw shaft 21 rotatably driven by the electric motor 10 and a nut 22 screwed with the screw shaft 21, and converts a rotary motion of the screw shaft 21 into a linear motion of the nut 22; and a housing 40 accommodating the electric motor 10 and the motion conversion mechanism 20. The housing 40 includes a pair of housing split bodies 41 and 42 split by a plane parallel to an axial direction of the screw shaft 21.

8 Claims, 7 Drawing Sheets

(51) Int. Cl.
*F16C 33/20* (2006.01)
*F16C 33/58* (2006.01)
*F16H 25/20* (2006.01)
*H02K 7/06* (2006.01)
*H02K 7/116* (2006.01)

(52) U.S. Cl.
CPC ............... *F16H 25/20* (2013.01); *H02K 7/06* (2013.01); *H02K 7/116* (2013.01)

(56) References Cited

U.S. PATENT DOCUMENTS

| | | | |
|---|---|---|---|
| 2012/0227524 A1 | 9/2012 | Takahashi et al. | |
| 2013/0154402 A1* | 6/2013 | Basavarajappa | B60L 3/0069 310/20 |
| 2015/0075311 A1* | 3/2015 | Kanzaki | F16H 57/02 74/421 A |
| 2017/0089115 A1* | 3/2017 | Wang | E05F 15/697 |
| 2019/0190348 A1* | 6/2019 | Verbridge | H02K 7/116 |
| 2019/0379254 A1* | 12/2019 | Denefleh | F16H 57/02 |
| 2020/0103024 A1* | 4/2020 | Jeon | F16H 63/3425 |
| 2021/0215237 A1* | 7/2021 | Wei | F16H 61/32 |

FOREIGN PATENT DOCUMENTS

| | | |
|---|---|---|
| JP | 2010-515412 | 5/2010 |
| JP | 2011-114921 | 6/2011 |
| JP | 2013-219949 | 10/2013 |
| JP | 2014-117074 | 6/2014 |
| JP | 2017-184482 | 10/2017 |
| WO | 2009/038212 | 3/2009 |

OTHER PUBLICATIONS

International Search Report dated Jan. 15, 2019 in International (PCT) Application No. PCT/JP2018/043279.

Notice of Reasons for Refusal dated Mar. 16, 2022 in corresponding Japanese Patent Application No. 2017-226806, with English translation.

\* cited by examiner

ELECTRIC ACTUATOR

TECHNICAL FIELD

The present invention relates to an electric actuator.

BACKGROUND ART

In recent years, motorization of vehicles and the like has been promoted for the purpose of saving power and reducing fuel consumption. For example, a system for operating an automatic transmission, brakes, steering, and the like of an automobile by the power of an electric motor has been developed and put on the market. As an actuator used for the above application, an electric actuator having a motion conversion mechanism such as a ball screw mechanism for converting a rotary motion generated by driving the electric motor into a linear motion is known.

In the above-described electric actuator, each of the components such as the electric motor and the motion conversion mechanism is accommodated inside a housing. For example, in Patent Literature 1 below, a housing is configured by combining plural cylindrical cases so that each component can be incorporated inside the housing.

CITATIONS LIST

Patent Literature

Patent Literature 1: JP 2017-184482 A

SUMMARY OF INVENTION

Technical Problems

In the electric actuator described in Patent Literature 1, because an internal structure of the housing is complicated, the housing is constituted of a large number of cylindrical cases (motor case, reduction gear case, transmission gear case, bearing case, shaft case, and the like). In this case, because mating surfaces of each of the cases are provided at plural locations, sealing means (for example, a gasket) needs to be provided on each mating surface to prevent intrusion of water or the like into the inside, the cost of the sealing means itself is required, and in addition, man-hours for providing the sealing means is required. Further, when the cylindrical cases are assembled with each other, the components accommodated inside each case need to be coupled with each other, which causes the assembling work to be complicated. Further, because the coupled portions of the components are covered with the assembled cylindrical case (housing) simultaneously with the coupling of the components with each other, it is not possible to check a quality of the coupled portions.

In view of the circumstances described above, an object of the present invention is to reduce the cost and improve the assemblability of an electric actuator.

Solution to Problems

In order to solve the above-described problem, the present invention provides an electric actuator that includes: an electric motor; a motion conversion mechanism that has a rotary member rotatably driven by the electric motor and a linear motion member screwed with the rotary member, and converts a rotary motion of the rotary member into a linear motion of the linear motion member; and a housing accommodating the electric motor and the motion conversion mechanism. In the electric actuator, the housing includes a pair of housing split bodies split by a plane parallel to an axial direction of the rotary member.

In this way, the housing is split by the plane parallel to the axial direction of the rotary member of the motion conversion mechanism. Accordingly, even when the internal structure is complicated, a housing structure in which each of the components can be incorporated can be obtained only by this split surface. Accordingly, because the sealing means needs to be provided only on the above-described split surface (mating surfaces of the pair of housing split bodies), the cost and man-hours can be reduced. Further, the above-described electric actuator can be assembled by assembling the electric motor and the motion conversion mechanism to one housing split body, and then fixing the other housing split body to the one housing split body. In this case, the components can be assembled to the one housing split body while a coupling state of the components accommodated in the housing is confirmed. Accordingly, the assemblability is improved and assembling failure can be securely prevented.

The above-described electric actuator can be provided with an annular radial bearing that supports an outer peripheral surface of the rotary member. When this radial bearing is directly attached to the housing, a backup surface supporting the radial bearing from behind is provided across the pair of housing split bodies, and accordingly, roundness of a bearing surface (inner peripheral surface) of the radial bearing deteriorates, and a rotational accuracy of the rotary member could be deteriorated. In particular, when the radial bearing is formed of resin, the radial bearing needs to be formed in a thin cylindrical shape in order to suppress the influence of molding shrinkage. However, when the radial bearing formed of thin resin as such is mounted on the backup surface provided across the pair of housing split bodies, the roundness of the bearing surface is likely to deteriorate.

For example, when a tool is inserted into the backup surface provided across the pair of housing split bodies in the axial direction in a state in which housing split bodies are temporarily assembled before being processed into the cylindrical surface shape, the backup surface can be processed with high roundness. However, in order to perform the above processing, it is necessary to provide an axial through hole for inserting the tool in the housing. In this case, the through hole provided in the housing needs to be sealed after the backup surface is processed, therefore, the number of components and man-hours increase, and the size of the electric actuator becomes large.

Therefore, it is preferable that a backup member be interposed between the radial bearing and the housing, a cylindrical surface-shaped backup surface continuous over the entire periphery be provided on an inner peripheral surface of the backup member, and the radial bearing be attached to this backup surface. In this case, because the backup surface to which the radial bearing is to be attached is provided in one component (backup member), the backup surface can be easily processed with high accuracy. As a result, the roundness of the backup surface and, consequently, the roundness of the bearing surface of the radial bearing increases, and the rotational accuracy of the rotary member is improved.

The above electric actuator can be provided with a thrust bearing that includes one raceway surface provided on one raceway wheel fixed to the rotary member, the other raceway surface provided on the backup member or on the other raceway wheel fixed to the backup member, and plural rolling elements interposed between the two raceway surfaces in the axial direction. As described above, when the rotary member is supported by the thrust bearing, the other raceway surface that supports the rolling elements is preferably provided directly on the backup member, or provided on the other raceway wheel fixed to the backup member. Thereby, a surface accuracy (flatness, runout accuracy, and the like) of the other raceway surface of the thrust bearing is enhanced. In addition, by providing the backup surface supporting the radial bearing and the backup surface supporting the raceway surface or raceway wheel of the thrust bearing on a common backup member, the internal structure of the housing can be made compact, and meanwhile, a relative positional accuracy between the raceway surface of the thrust bearing and the bearing surface of the radial bearing is enhanced to further improve the rotational accuracy of the rotary member.

It is preferable that the electric actuator be provided with restricting means that restricts an axial movement of the linear motion member at a predetermined position. For example, by bringing an end surface of the linear motion member into contact with an end surface of a member axially opposing thereto, the further axial movement of the linear motion member can be restricted. However, in this case, because the end surface of the linear motion member and the end surface of the member axially opposing thereto are pressed against each other by strong force and bite each other, it may become difficult to subsequently rotate the rotary member in the opposite direction.

Therefore, it is preferable that a projection portion be provided on the end surface of the linear motion member and a projection portion be also provided on an end surface of the one raceway wheel of the thrust bearing axially opposing to the end surface of the linear motion member, and the projection portion of the linear motion member be engaged with the projection portion of the one raceway wheel in the rotation direction to restrict the axial movement of the linear motion member. In this way, by bringing the projection portions provided on the linear motion member and the raceway wheel of the thrust bearing into contact with each other in the rotation direction, the biting between the end surface of the linear motion member and the end surface of the raceway wheel is avoided, and accordingly, the rotary member can be subsequently rotated in the opposite direction without difficulty.

Advantageous Effects of Invention

As described above, by constituting the housing that accommodates the electric motor and the motion conversion mechanism with the pair of housing split bodies split by the plane parallel to the axial direction of the rotary member, the cost can be reduced and the assemblability of the electric actuator can be improved.

DESCRIPTION OF EMBODIMENTS

Hereinafter, embodiments of the present invention are described with reference to the drawings.

Figure 1:
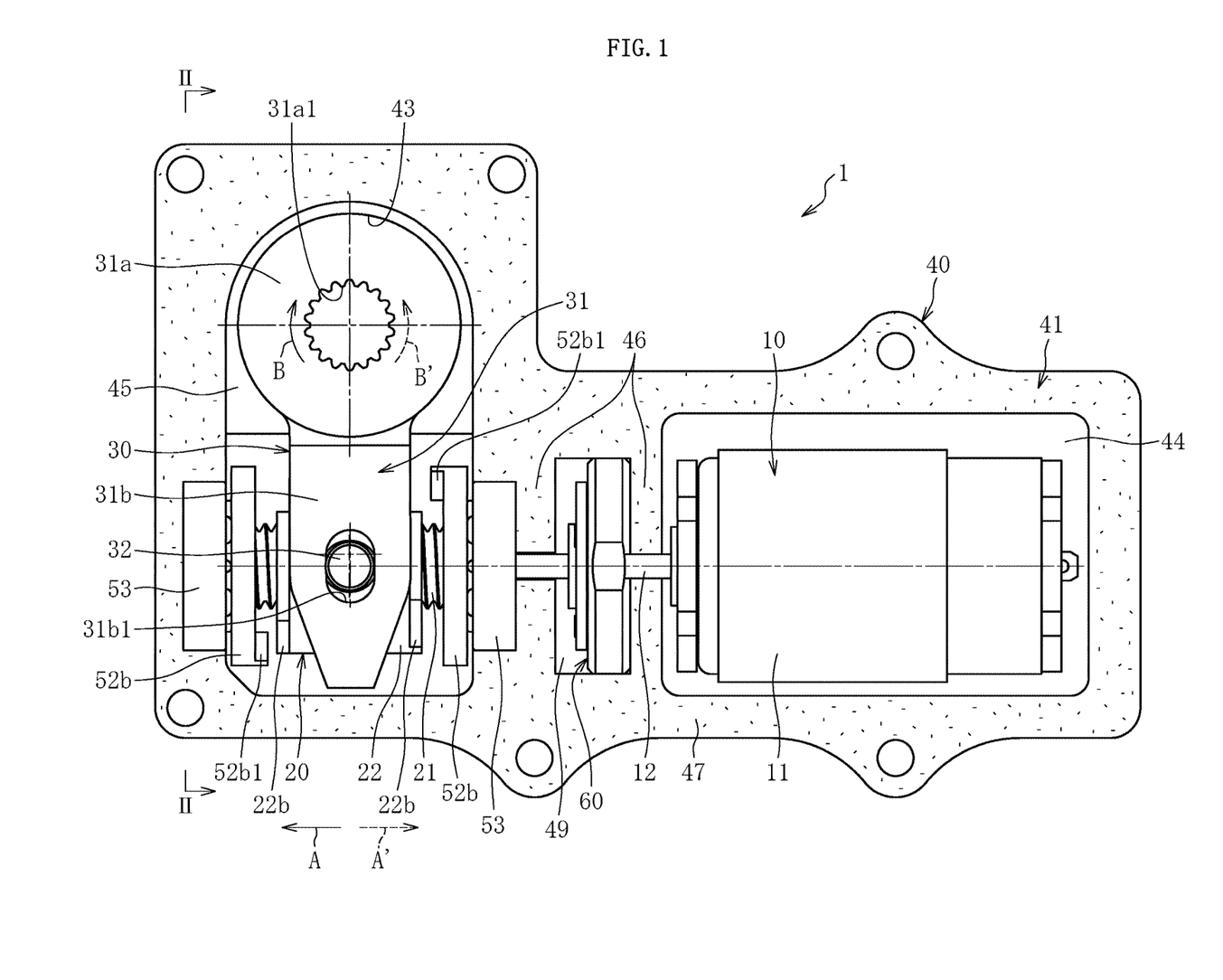
FIG. 1 is a plan view showing a state in which the other housing split body of an electric actuator is removed.
Figure 2:
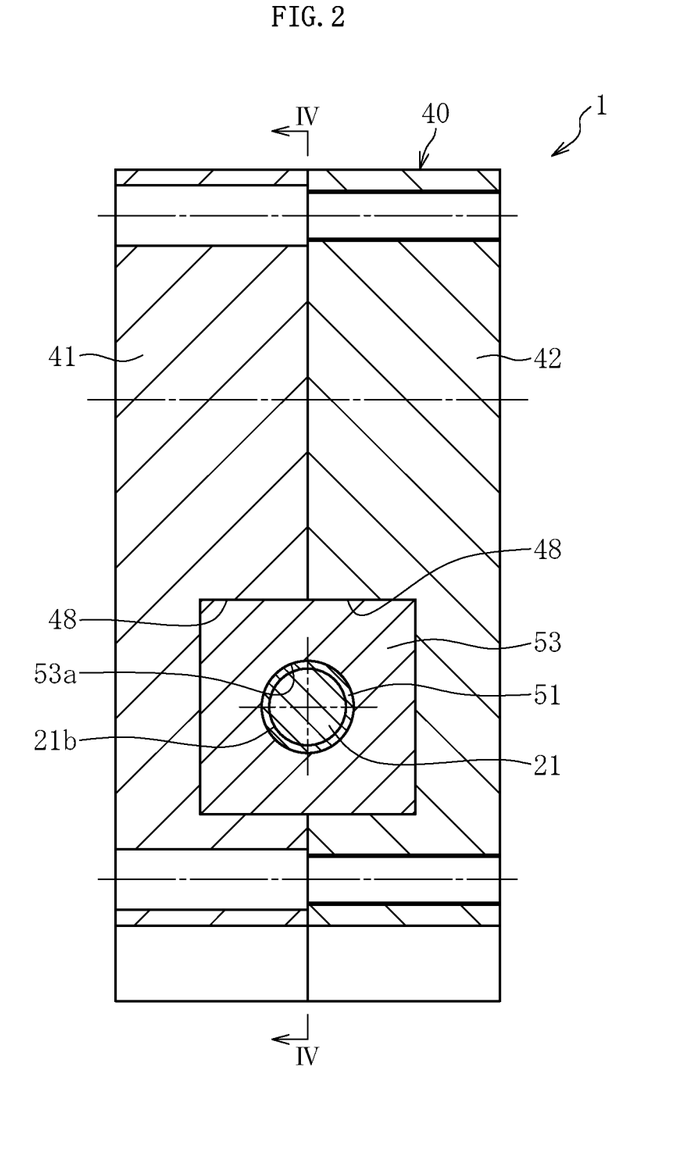
FIG. 2 is a cross-sectional view taken along a line II-II of FIG. 1.

As shown in FIG. 1, an electric actuator 1 according to the present embodiment includes an electric motor 10, a reduction gear 60 that reduces and outputs a rotary motion of the electric motor 10, a first motion conversion mechanism 20 that converts the rotary motion output from the reduction gear 60 into a linear motion, a second motion conversion mechanism 30 that converts the linear motion output from the first motion conversion mechanism 20 into a rotary motion of an output shaft (not shown), and a housing 40 that accommodates the above components. As shown in FIG. 2, the housing 40 includes a pair of housing split bodies 41 and 42. FIG. 1 shows a state of one housing split body 41 from which the other housing split body 42 is removed, and each of the components accommodated inside the housing 40 is visible.

The electric motor 10 is a known brushed motor or brushless motor, and has a motor body 11 and a rotary shaft 12. Wiring (not shown) is connected to the motor body 11, and the wiring extends to the outside via a through hole (not shown) provided in the housing 40. A gap between the through hole and the wiring is sealed with a grommet (not shown) made of rubber or the like.

Figure 3:
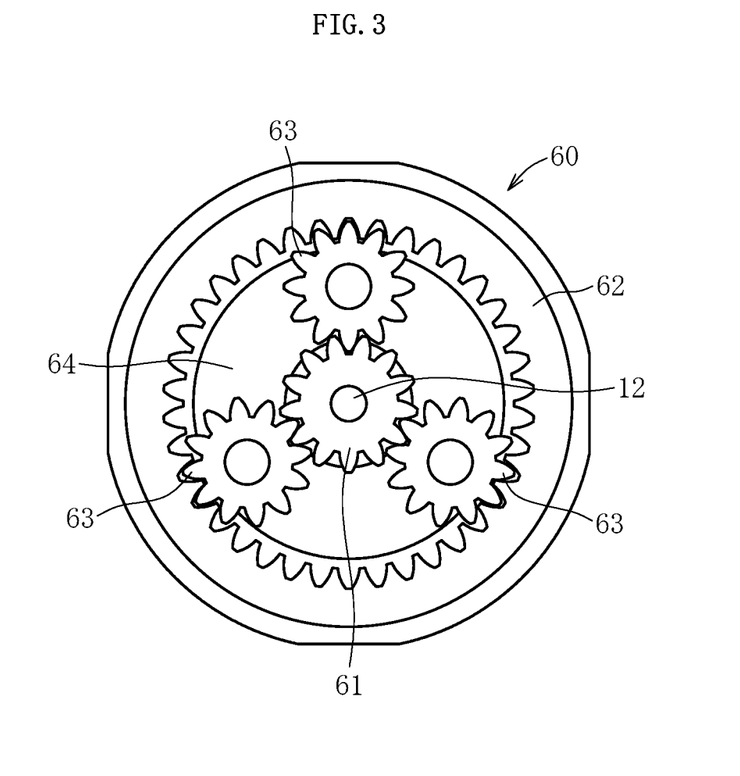
FIG. 3 is a front view of a reduction gear.

The reduction gear 60 is arranged between the electric motor 10 and the first motion conversion mechanism 20 in the axial direction. In the present embodiment, a planetary gear mechanism as shown in FIG. 3 is used as the reduction gear 60. Specifically, the reduction gear 60 includes a sun gear 61 as an input rotary body, a ring gear 62 as a raceway ring arranged on an outer periphery of the sun gear 61, plural planetary gears 63 as planetary rotary bodies rotatably arranged between the sun gear 61 and the ring gear 62, and a carrier 64 as an output rotary body holding each planetary gear 63.

The sun gear 61 is fixed to the rotary shaft 12 of the electric motor 10, and rotates integrally with the rotary shaft 12. The ring gear 62 is fixed so as not to rotate with respect to the housing 40. The plural planetary gears 63 are arranged between the sun gear 61 and the ring gear 62, and are assembled so as to mesh therewith. Further, each planetary gear 63 has its axis center rotatably attached to the carrier 64 by a pin or the like. When the rotary shaft 12 of the electric motor 10 is rotatably driven, the sun gear 61 rotates integrally therewith, and the plural planetary gears 63 revolve along the ring gear 62 while rotating on its axis. As a result, the carrier 64 rotates at a lower rotational speed and higher torque than the rotary shaft 12.

Figure 4:
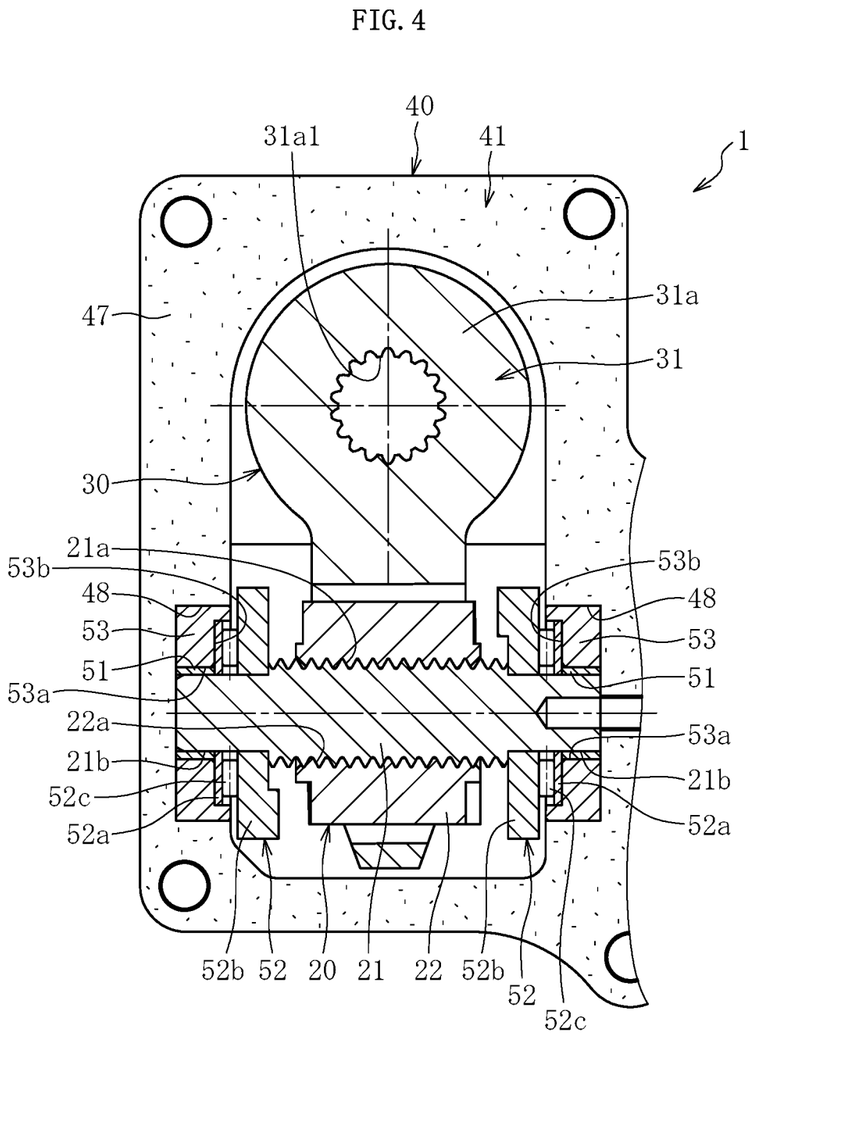
FIG. 4 is a cross-sectional view taken along a line IV-IV in FIG. 2.

The first motion conversion mechanism 20 is constituted of a screw mechanism including a screw shaft 21 as a rotary member and a nut 22 as a linear motion member screwed to the screw shaft 21. The screw shaft 21 and the nut 22 are formed of metal, for example, steel. In the present embodiment, as shown in FIG. 4, the first motion conversion mechanism 20 is constituted of a sliding screw mechanism in which a screw groove 21a formed in an outer peripheral surface of the screw shaft 21 directly comes into contact and is screwed with a screw groove 22a formed in an inner peripheral surface of the nut 22. The screw shaft 21 is coupled to the carrier 64 of the reduction gear 60, and rotates integrally with the carrier 64. When the rotary shaft 12 of the electric motor 10 rotates in the forward or reverse direction, and its rotary motion is transmitted to the screw shaft 21 via the reduction gear 60, the screw shaft 21 rotates in the forward or reverse direction, and along therewith, the nut 22 moves forward and backward in the axial direction, causing the rotary motion to be converted into the linear motion. Note that, instead of the sliding screw mechanism, a ball screw mechanism having multiple balls interposed between the screw groove of the screw shaft and the screw groove of the nut may be used as the first motion conversion mechanism 20.

As shown in FIG. 1, the second motion conversion mechanism 30 includes a swing member 31 having a cylindrical portion 31a and an arm portion 31b. The arm portion 31b of the swing member 31 is coupled to the nut 22. Specifically, a pin-shaped coupling member 32 projecting from the nut 22 is inserted into a long hole 31b1 formed in the arm portion 31b. A spline hole 31a1 is provided on an inner periphery of the cylindrical portion 31a of the swing member 31. The output shaft (not shown) extending in a direction perpendicular to the screw shaft 21 is inserted into the spline hole 31a1, and these are spline-fitted to allow torque to be transmitted. An outer peripheral surface of the cylindrical portion 31a of the swing member 31 is inserted into a through hole 43 provided in each of the housing split bodies 41 and 42, and is slidably supported by an inner peripheral surface of the through hole 43. When the swing member 31 having the above configuration swings about the spline hole 31a1, the linear motion of the nut 22 is converted into the rotary motion of the output shaft inserted into the spline hole 31a1.

As described above, the output of the electric motor 10 is output to the output shaft orthogonal to the rotary shaft 12 of the electric motor 10 via the reduction gear 60, the first motion conversion mechanism 20 (screw mechanism), and the second motion conversion mechanism 30. Accordingly, as well as a large reduction ratio can be obtained, the electric actuator 1 can be downsized (thinned) in the axial direction of the output shaft (direction orthogonal to a drawing plane of FIG. 1).

The pair of housing split bodies 41 and 42 constituting the housing 40 are formed of, for example, metal, and in the present embodiment, are formed of an aluminum alloy. Each of the housing split bodies 41 and 42 is formed with a first accommodating portion 44 in which the electric motor 10 is accommodated, a second accommodating portion 45 in which the first motion conversion mechanism 20 and the second motion conversion mechanism 30 are accommodated, and a third accommodating portion 49 in which the reduction gear 60 is accommodated. Each of the housing split bodies 41 and 42 is provided with partition portions 46 that partition the first accommodating portion 44 and the third accommodating portion 49, the third accommodating portion 49 and the second accommodating portion 45, respectively. When these housing split bodies 41 and 42 are joined to each other, three spaces (the first accommodating portion 44, the second accommodating portion 45, and the third accommodating portion 49) partitioned by the partition portions 46 are formed between the two housing split bodies 41 and 42.

A region indicated by a dotted pattern in FIG. 1 in the one housing split body 41 is a mating surface 47 with the other housing split body 42. Note that a mating surface 47 similar to the above is also formed on the other housing split body 42. In the present embodiment, the mating surface 47 is provided on a single plane with no step, and specifically, is provided on a plane parallel to the axial direction of the screw shaft 21. In the illustrated example, the housing 40 is split by a plane that includes the axis of the screw shaft 21 and is orthogonal to the axial direction of the output shaft (spline hole 31a1).

A gasket as sealing means is provided between the mating surfaces 47 of the housing split bodies 41 and 42 (not shown). The gasket is provided along an outer periphery of the mating surface 47, and is provided, for example, over the entire region of the mating surface 47. The gasket is made of, for example, a thin plate made of resin, rubber, metal, or the like. In addition, a liquid gasket may be used as the gasket. The gasket seals a space between the mating surfaces 47 of the two housing split bodies 41 and 42 over the entire periphery thereof so as to prevent foreign matters such as dust and water from entering the housing 40.

As described above, by splitting the housing 40 along the plane parallel to the axial direction of the screw shaft 21, a housing structure can be obtained in which the electric motor 10, the reduction gear 60, and the motion conversion mechanisms 20 and 30 can be incorporated only with one split surface (the mating surfaces 47 of the housing split bodies 41 and 42). By this, the internal space of the housing 40 can be sealed simply by providing the sealing means (gasket) between the mating surfaces 47 of the two housing split bodies 41 and 42, and accordingly, the cost is reduced and the assemblability is improved.

The screw shaft 21 of the first motion conversion mechanism 20 is rotatably attached to the housing 40 with radial bearings 51 and thrust bearings 52 interposed therebetween.

Each of the radial bearings 51 is formed in an annular shape, and is formed in a thin cylindrical shape by, for example, resin or high-hardness metal (see FIG. 2). In the present embodiment, as shown in FIG. 4, among the outer peripheral surface of the screw shaft 21, cylindrical surfaces 21b provided on both axial sides of the screw groove 21a are supported by the radial bearings 51, respectively. In the illustrated example, the cylindrical surface 21b of the screw shaft 21 is slidably supported on an inner peripheral surface of the radial bearing 51. Each of the radial bearings 51 is not directly attached to the housing 40, but is attached to the housing 40 with a backup member 53 interposed therebetween. The backup member 53 is formed of metal, for example, steel. The backup member 53 is not subjected to surface hardening such as quenching. As shown in FIG. 2, the backup member 53 has a rectangular outer peripheral surface, and is fitted and fixed in rectangular recessed portions 48 formed in the respective housing split bodies 41 and 42. An inner peripheral surface 53a of the backup member 53 is formed in a continuous cylindrical surface shape over the entire periphery, and functions as a backup surface to which an outer peripheral surface of the radial bearing 51 is attached.

As shown in FIG. 4, each of the thrust bearings 52 includes a pair of disk-shaped raceway wheels 52a and 52b, and plural rolling elements 52c interposed between the two raceway wheels 52a and 52b in the axial direction. All of the two raceway wheels 52a and 52b and the plural rolling elements 52c are formed of metal, for example, steel. The one raceway wheel 52a is formed of a hollow disk-shaped thin plate, and is fixed to an end surface 53b of the backup member 53. The other raceway wheel 52b has a hollow disk shape and is fixed to the cylindrical surface 21b on the outer peripheral surface of the screw shaft 21. The rolling element 52c is formed of, for example, a needle roller, and is interposed between raceway surfaces provided on the two raceway wheels 52a and 52b. In the present embodiment, the thrust bearings 52 are provided at two places separated in the axial direction of the screw shaft 21, and the screw shaft is supported by the thrust bearings 52 in both thrust directions. With this configuration, when the screw shaft 21 is rotated to move the nut 22 in the axial direction to thereby swing the swing member 31, a reaction force applied to the screw shaft 21 can be received by the two thrust bearings 52. Accordingly, the axial movement of the screw shaft 21 can be restricted.

As described above, the backup surface to which the radial bearing 51 is attached is not provided across the pair of housing split bodies 41 and 42, but is provided on the inner peripheral surface 53a of the backup member 53 formed of one component. Accordingly, high surface accuracy (particularly roundness) can be imparted to this backup surface. As a result, the roundness of the radial bearing 51, in particular, the roundness of the inner peripheral surface serving as the bearing surface is increased, and the rotational accuracy of the screw shaft 21 is increased. Therefore, problems such as generation of abnormal noise can be prevented.

Similarly, by providing the backup surface for attaching the raceway wheel 52a of the thrust bearing 52 to the end surface 53b of the backup member 53, high surface accuracy (particularly, runout accuracy) can be imparted to this backup surface. Thereby, the surface accuracy of the raceway surface provided on the raceway wheel 52a is enhanced, and the rotational accuracy of the screw shaft 21 is enhanced. In particular, in the present embodiment, because the radial bearing 51 and the raceway wheel 52a of the thrust bearing 52 are attached to the common backup member 53, the internal structure of the housing 40 is made compact, and the relative positional accuracy between the bearing surface of the radial bearing 51 and the raceway surface of the thrust bearing 52 is enhanced, and accordingly, the rotational accuracy of the screw shaft 21 is further enhanced.

Further, when the screw shaft 21 formed of steel is radially supported by the housing 40 formed of aluminum alloy, because a difference in coefficient of linear expansion between the screw shaft and the housing is large, a radial bearing gap therebetween varies depending on the temperature. In contrast, as in the present embodiment, by supporting the screw shaft 21 formed of steel material with the radial bearing 51 attached to the backup member 53 also formed of steel material, the variation in the radial bearing gap caused by the difference in coefficient of linear expansion is suppressed and thereby the support of the screw shaft 21 can be stabilized.

Additionally, after the housing split bodies 41 and 42 are formed by casting, cutting is performed on a portion requiring high accuracy. In the present embodiment, among the housing split bodies 41 and 42, the cutting is performed on the mating surfaces 47 and inner surfaces of the recessed portions 48 to which the backup member 53 is attached. At this time, for example, among the housing 40, when an axial through-hole is provided on the extension of the screw shaft 21, in a state in which the pair of housing split bodies 41 and 42 are temporarily assembled, a tool is inserted through the above-described through hole from the outside of the housing 40, and the inner surfaces of the recessed portions 48 can be processed into a cylindrical surface with the tool. However, because the housing 40 of the present embodiment is not provided with the above-described through hole, the inner surfaces of the recessed portions 48 cannot be machined by the above-described method. For this reason, in the present embodiment, the tool is accessed in a direction orthogonal to the mating surface 47 of each of the housing split bodies 41 and 42 (from the near side in FIG. 4), to cut the inner surfaces of the recessed portions 48. In this case, it is difficult to process the inner surfaces of the recessed portions 48 into a cylindrical shape having highly accurate roundness. However, by forming the recessed portions 48 in a rectangular shape as in the present embodiment, the inner surfaces of the recessed portions 48 can be easily processed even in the direction orthogonal to the mating surface 47.

Figure 5A:
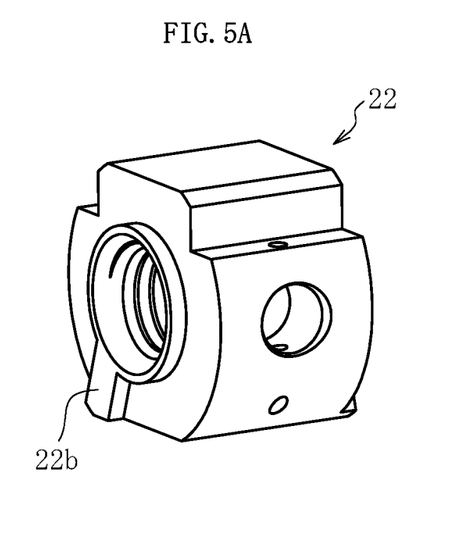
FIG. 5A is a perspective view of a nut as viewed from one side in an axial direction.
Figure 5B:
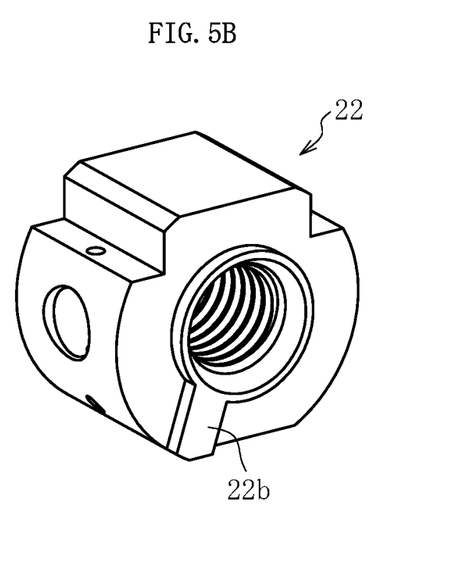
FIG. 5B is a perspective view of the nut as viewed from the other side in the axial direction.
Figure 6:
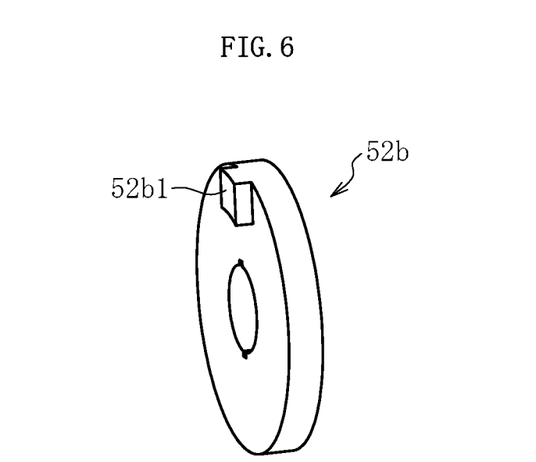
FIG. 6 is a perspective view of the other raceway wheel of a thrust bearing.

Further, in the present embodiment, as shown in FIG. 1, projection portions 22b are provided on both end surfaces in the axial direction of the nut 22, and projection portions 52b1 axially opposing these end surfaces are provided on the end surfaces of the other raceway wheels 52b of the thrust bearings 52. Specifically, as shown in FIGS. 5A and 5B, the projection portions 22b are provided so as to project from both end surfaces of the nut 22 in the axial direction. Further, as shown in FIG. 6, the projection portions 52b1 are provided so as to project from the end surfaces (end surface on the opposite side to the raceway surface) of the other raceway wheels 52b of the thrust bearings 52. The end surfaces of the nut 22 including the projection portions 22b and the end surfaces of the raceway wheels 52b including the projection portions 52b1 are subjected to the surface hardening such as quenching.

In the above-described electric actuator 1, when the rotary shaft 12 of the electric motor 10 is rotated in the forward direction, this rotary motion is transmitted to the screw shaft 21 via the reduction gear 60 to cause the screw shaft 21 to rotate in the forward direction. Then, the nut 22 screwed to the screw shaft 21 moves to one side in the axial direction (direction of an arrow A in FIG. 1). Along with this, the swing member 31 attached to the nut 22 swings, and the output shaft inserted into the spline hole 31a1 of the cylindrical portion 31a of the swing member 31 rotates in the direction of an arrow B in FIG. 1. On the other hand, when the electric motor 10 is rotated in the reverse direction, the screw shaft 21 rotates in the reverse direction, and the nut 22 moves in the other axial direction (direction of a dotted arrow A' in FIG. 1). Along with this, the swing member 31 attached to the nut 22 swings, and the output shaft inserted into the spline hole 31a1 of the cylindrical portion 31a of the swing member 31 rotates in the direction of a dotted arrow B' in FIG. 1.

When the nut 22 reaches one of axial end portions, the raceway wheel 52b of the thrust bearing 52 fixed to the screw shaft 21 and the nut 22 come into contact with each other, causing further axial movement of the nut 22 to be restricted. At this time, when the end surface of the raceway wheel 52b of the thrust bearing 52 and the end surface of the nut 22 are made to abut in the axial direction to restrict the axial movement of the nut 22, these end surfaces are subjected to a strong force decelerated by the screw mechanism, which causes the end surfaces to be pressed against and bite each other. Consequently, it may become difficult to rotate the screw shaft 21 in the opposite direction thereafter.

In the present embodiment, as shown in FIGS. 5A, 5B, and 6, the projection portions 22b and 52b1 are provided on the end surface of the nut 22 and the end surface of the raceway wheel 52b of the thrust bearing 52, respectively. By engaging these projection portions in the rotation direction, the rotation of the screw shaft 21 is restricted, and further axial movement of the nut 22 is restricted. In this manner, the nut 22 and the raceway wheel 52b of the thrust bearing 52 are not brought into contact in the axial direction, but the projection portions 22b and 52b1 provided on the nut 22 and the raceway wheel 52b are brought into contact with each other in the rotation direction to avoid the biting between the end surface of the nut 22 and the end surface of the raceway wheel 52b. Accordingly, the screw shaft 21 can be rotated in the opposite direction without difficulty thereafter.

The electric actuator 1 is assembled in the following procedure.

First, as shown in FIG. 1, all the components to be accommodated in the housing 40 (the electric motor 10, the reduction gear 60, the first motion conversion mechanism 20, the second motion conversion mechanism 30, the radial bearings 51, the thrust bearings 52, and the backup members 53) are assembled in the one housing split body 41 formed by splitting the cylindrical housing 40 in half. At this time, each component can be assembled in the housing split body 41 in a state in which all components can be visually confirmed from the outside. By this, each component can be assembled in the one housing split body 41 while an attachment state of each component to the housing split body 41 and coupling states between components are confirmed (for example, the coupling state between the rotary shaft 12 of the electric motor 10 and the sun gear 61 of the reduction gear 60, the coupling state between the carrier 64 of the reduction gear 60 and the screw shaft 21, the coupling state between the nut 22 and the swing member 31 with the coupling member 32 interposed therebetween, and the like).

Figure 7:
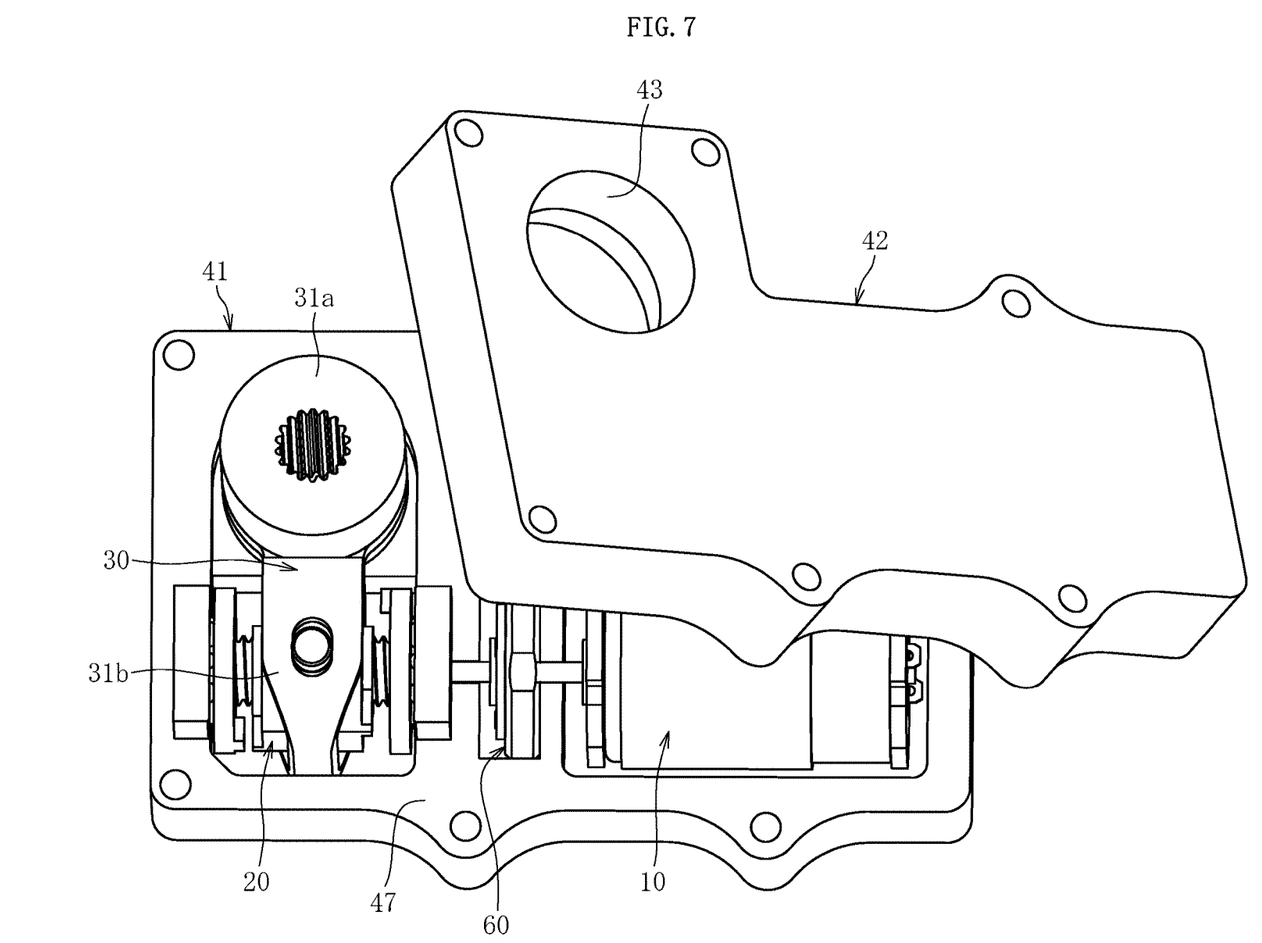
FIG. 7 is a perspective view showing a state in which one housing split body having respective components incorporated therein is assembled with the other housing split body.

Then, arranging the gasket on the mating surface 47 of the one housing split body 41, as shown in FIG. 7. Then, the other housing split body 42 is overlaid on the one housing split body 41, and the gasket is sandwiched between the mating surfaces 47 of the two housing split bodies 41 and 42. In this state, the electric actuator 1 is completed by fixing the two housing split bodies 41 and 42 with bolts (not shown) or the like.

The present invention is not limited to the above embodiment. Hereinafter, other embodiments of the present invention are described; however, the description of the same points as those of the above embodiment is omitted.

Figure 8A:
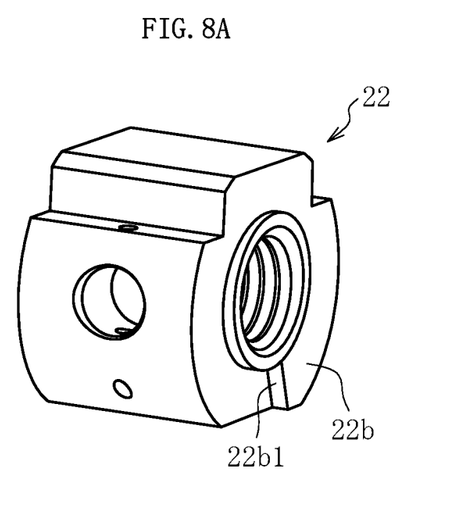
FIG. 8A is a perspective view of a nut according to another embodiment as viewed from one side in the axial direction.
Figure 8B:
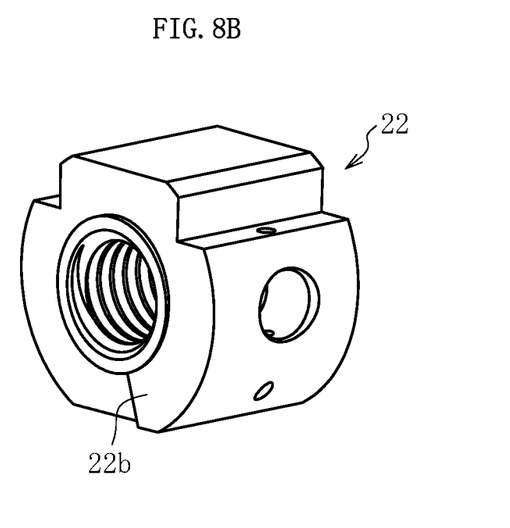
FIG. 8B is a perspective view of the nut according to another embodiment as viewed from the other side in the axial direction.
Figure 9:
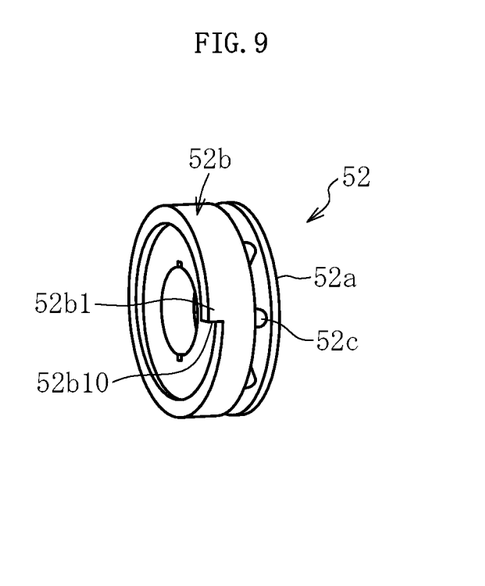
FIG. 9 is a perspective view of a thrust bearing according to another embodiment.

FIGS. 8A, 8B, and 9 show another example of the projection portion 22b provided on the end surface of the nut 22 and the projection portion 52b1 provided on the raceway wheel 52b of the thrust bearing 52. In this embodiment, the projection portion 22b provided on the end surface of the nut 22 is formed in a tapered shape projecting in the axial direction toward one side in the circumferential direction. Similarly, the projection portion 52b1 provided on the raceway wheel 52b of the thrust bearing 52 is formed in a tapered shape projecting in the axial direction toward one side in the circumferential direction. When a side surface 22b1 of the projection portion 22b of the nut 22 and a side surface 52b10 of the projection portion 52b1 of the raceway wheel 52b of the thrust bearing abut against each other in the rotation direction, the rotation of the raceway wheel 52b and the screw shaft 21 is restricted, and thereby the axial movement of the nut 22 is restricted.

In the above embodiment, the radial bearing 51 and the backup member 53 are formed separately. However, a component obtained by integrating the above two may be used as the radial bearing. When the radial bearing integrated with the backup member is formed of iron-based material as described above, it is preferable to perform the surface hardening such as quenching on the inner peripheral surface serving as the bearing surface. Alternatively, the radial bearing integrated with the backup member may be constituted of a sintered oil-impregnated bearing.

Further, in the above-described embodiment, the raceway wheel 52a of the thrust bearing 52 and the backup member 53 are formed separately. However, a component obtained by integrating the above two may be used as the raceway wheel of the thrust bearing. When the raceway wheel integrated with the backup member is formed of iron-based material as described above, it is preferable to perform the surface hardening such as quenching on the end surface serving as the raceway surface. Alternatively, the raceway wheel integrated with the backup member may be constituted of a sintered oil-impregnated bearing. Further, the thrust bearing 52 is not limited to a rolling bearing, but may be a sliding bearing. Further, the thrust bearing 52 may be omitted unless it is particularly necessary.

Further, the type of the reduction gear 60 is not limited to the one of the above embodiment, and for example, a planetary gear mechanism having two or more stages or a parallel shaft gear mechanism can be used. If not particularly necessary, the reduction gear 60 may be omitted, and the rotary shaft 12 of the electric motor 10 and the screw shaft 21 of the first motion conversion mechanism 20 may be directly coupled.

Further, in the above embodiment, the case has been described in which the screw shaft 21 of the first motion conversion mechanism 20 is the rotary member, and the nut 22 is the linear motion member. However, conversely thereto, the nut may a rotary member, and the screw shaft may be a linear motion member.

Further, in the above embodiment, the electric actuator 1 has the second motion conversion mechanism 30 having the swing member 31. However, another mechanism may be adopted as the second motion conversion mechanism. Further, the second motion conversion mechanism may be omitted unless it is particularly necessary.

REFERENCE SIGNS LIST

1 Electric actuator
10 Electric motor
12 Rotary shaft
20 First motion conversion mechanism
21 Screw shaft (Rotary member)
22 Nut (Linear motion member)
30 Second motion conversion mechanism
31 Swing member
40 Housing
41, 42 Housing split body
51 Radial bearing
52 Thrust bearing
52a, 52b Raceway wheel
52c Rolling element
53 Backup member
60 Reduction gear

The invention claimed is:
1. An electric actuator comprising:
an electric motor;

a motion conversion mechanism that has a rotary member rotatably driven by the electric motor and a linear motion member screwed with the rotary member, the motion conversion mechanism converting a rotary motion of the rotary member into a linear motion of the linear motion member; and a housing accommodating the electric motor and the motion conversion mechanism, wherein the housing includes a pair of housing split bodies split by a plane parallel to an axial direction of the rotary member.

2. The electric actuator according to claim 1, further comprising a radial bearing having an annular shape and supporting an outer peripheral surface of the rotary member.

3. The electric actuator according to claim 2, wherein the radial bearing is formed of resin.

4. The electric actuator according to claim 1, wherein the motion conversion mechanism comprises a sliding screw mechanism.

5. The electric actuator according to claim 1, wherein the motion conversion mechanism comprises a ball screw mechanism.

6. An electric actuator comprising:

an electric motor;

a motion conversion mechanism that has a rotary member rotatably driven by the electric motor and a linear motion member screwed with the rotary member, the motion conversion mechanism converting a rotary motion of the rotary member into a linear motion of the linear motion member;

a housing accommodating the electric motor and the motion conversion mechanism;

a radial bearing having an annular shape and supporting an outer peripheral surface of the rotary member; and a backup member interposed between the radial bearing and the housing, wherein the housing includes a pair of housing split bodies split by a plane parallel to an axial direction of the rotary member, and wherein a backup surface having a cylindrical surface shape and continuous over an entire periphery is provided on an inner peripheral surface of the backup member, and the radial bearing is attached to the backup surface.

7. The electric actuator according to claim 6, further comprising a thrust bearing that includes one raceway surface provided on one raceway wheel fixed to the rotary member, another raceway surface provided on the backup member or on another raceway wheel fixed to the backup member, and a plurality of rolling elements interposed between the one raceway surface and the other raceway surface in the axial direction.

8. The electric actuator according to claim 7, further comprising a projection portion provided on an end surface of the linear motion member and a projection portion provided on an end surface of the one raceway wheel of the thrust bearing axially opposing to the end surface of the linear motion member, wherein the projection portion of the linear motion member is engaged with the projection portion of the one raceway wheel in a rotation direction to restrict an axial movement of the linear motion member.

* * * * *